United States Patent [19]

Brader, Jr. et al.

[11] 4,021,384

[45] May 3, 1977

[54] INFUSED POLYMER CONTAINING POLYOLS AND POLYURETHANE COMPOSITIONS BASED THEREON

[75] Inventors: Walter H. Brader, Jr.; Michael Cuscurida; Lewis W. Watts, Jr., all of Austin, Tex.

[73] Assignee: Texaco Development Corporation, New York, N.Y.

[22] Filed: Dec. 22, 1975

[21] Appl. No.: 642,978

[52] U.S. Cl. .................. 260/2.5 AP; 260/77.5 AP; 260/77.5 CR; 260/614 AA; 260/615 R; 260/615 B
[51] Int. Cl.$^2$ ................. C08G 18/14; C08G 18/63; C07C 43/04
[58] Field of Search ............ 260/2.5 AP, 77.5 AP, 260/614 AA, 615 R, 615 B, 77.5 CR, 33.4 R

[56] References Cited

UNITED STATES PATENTS

| | | | |
|---|---|---|---|
| 3,652,639 | 3/1972 | Pizzini et al. | 260/75 NN |
| 3,823,201 | 7/1974 | Pizzini et al. | 260/33.4 R |
| 3,981,907 | 9/1976 | Hattori et al. | 260/614 AA |

FOREIGN PATENTS OR APPLICATIONS

| | | | |
|---|---|---|---|
| 788,155 | 2/1973 | Belgium | 260/33.4 R |

OTHER PUBLICATIONS

DOS 2,148,156, Mar. 1972, ICI.

*Primary Examiner*—H.S. Cockeram
*Attorney, Agent, or Firm*—Carl G. Ries; Thomas H. Whaley; Lee G. Meyer

[57] ABSTRACT

Disclosed is a novel infused polymer containing polyol composition useful in producing improved urethane products. The novel composition is characterized as a polymer containing polyol wherein the polymeric moiety is chemically attached or "infused" into the unsaturation sites of an oxyalkadienyl moiety which is covalently bonded to an acyclic polyhydric compound.

17 Claims, No Drawings

INFUSED POLYMER CONTAINING POLYOLS AND POLYURETHANE COMPOSITIONS BASED THEREON

BACKGROUND OF THE INVENTION

1. Field of the Invention

The present invention relates to novel polymer containing polyol compositions; and more particularly, to an improved infused polymer containing polyol prepared by infusion of certain polymerizable monomers onto unsaturation sites of an oxyalkadienyl containing polyol.

2. Prior Art

"Polyurethane" is generally descriptive of a broad class of polymeric materials which contain numerous urethane linkages throughout the structure. Such materials are produced by the reaction of a material containing one or more free isocyanate moieties with a material containing one or more active hydroxyl groups. The interaction of a free isocyanate with an active hydroxy yields a urethane linkage.

Polyurethane compositions are conventionally prepared by the use of a polyfunctional free isocyanate containing material and a polyfunctional hydroxyl containing material such as a polyester or polyether polyol. The polyfunctionality of the reactants provides crosslinking which strengthens the material.

It has been disclosed that the polyfunctional hydroxy containing materials dispersed in a polymer medium are effective in producing superior polyurethane foams. These mixtures have become known in the art as polymer polyols and are sometimes referred to as graft polymers. Examples of such compositions and their use are found in U.S. Pat. No. 3,383,351.

These graft polyols are formed by the in situ polymerization of a monomer in the presence of a saturated polyol medium. Purportedly, during the reaction, one or more of the monomers is "grafted" to the saturated polyol constituent by displacement of a hydrogen with the resultant formation of the covalent bond. The actual occurrence of this grafting of monomer to polyol containing chain has been shown slight in relation to the formation of the vinyl polymer. Thus, these polymer/polyols are in actuality an intimate admixture.

Purportedly the utilization of these polymer/polyol mixtures in urethane formulations yields polyurethane compositions having certain desirable physical properties while providing a plurality of active hydroxy sites for crosslinking the nucleus of the polyol constituent into the polyurethane network. However, the polymeric moiety is not bonded to the polyol moiety and thus not "chemically linked" into the resulting urethane composition.

Attempts to chemically bond or infuse the polymeric constituent into the polyol molecule have not generally met with success. One method involves the introduction of ethylenic unsaturation into the polyol structure by reaction of a polyhydric initiator with an organic compound having both ethylenic unsaturation and a reactive functional group such as hydroxyl or carboxyl. See, for example, U.S. Pat. No. 3,652,639.

These compounds are generally prepared by reacting dicarboxyl terminated moieties containing ethylenic unsaturation or a moiety containing both an epoxide and ethylenic unsaturation with a polyol. When an epoxide is used, the ring opening reaction yields a secondary hydroxy. Upon alkoxylation to produce the very desirable polyether product, the secondary alcohols do not alkoxylate readily.

When the dicarboxyl containing material or the corresponding anhydride is utilized, crosslinking can occur. Specifically, the reaction carboxyl group can react with for example two hydroxy moieties on a single polyol molecule producing a "cyclic" type product. Thus, hydroxy moieties contained within this cyclic structure can be hindered in the subsequent isocyanate reaction. Additionally, since the carboxyl containing moiety is difunctional, it can act as a crosslinking agent to tie two polyol containing compounds together. This increases viscosity, reduces functionality, and can produce a solid product if the conditions are not carefully controlled. The carboxyl/hydroxy linkages formed are esters which cannot be readily alkoxylated. Further, remaining unreacted carboxyl groups must be esterified by use of an alcohol.

It has now been found that a novel class of polymer containing polyols which are better characterized as infused polymer containing polyols exhibit exceptional stability, do not undergo large viscosity changes upon prolonged storage, have an exceptionally high portion of polymerized monomer fused into the polyol structure and can be readily alkoxylated. One outstanding advantage is that single chain substitutent carries two ethylenic unsaturated sites to the polyol molecule. Additionally, these compounds do not contain a second functional group on the unsaturation containing chain and thus will not crosslink or cyclize during preparation.

SUMMARY OF THE INVENTION

According to the broad aspects of the instant invention, an infused polymer containing polyol composition having at least one polymeric chain chemically bonded through one or more unsaturated sites of an oxyalkadienyl containing polyhydric compound is provided.

Preferably the polymer containing polyol is prepared by the in situ polymerization of at least one ethylenically unsaturated compound in a reaction medium comprising an oxyalkadienyl containing polyol.

The oxyalkadienyl containing polyols are preferably produced by contacting certain acyclic conjugated dienes with an acyclic polyol in the presence of a catalytically effective amount of a catalyst system consisting essentially of a divalent palladium complex, and at least one trivalent organophosphine ligand.

According to another aspect, the infused polymer containing polyols are used to produce improved urethane compositions.

DESCRIPTION OF PREFERRED EMBODIMENTS

According to a preferred embodiment, an infused polymer containing polyol is prepared by the in situ free radical catalyzed polymerization of acrylonitrile and a styrene co-monomer in a ratio of from about 1:3 to about 3:1 moles of acrylonitrile to styrene at temperatures in the range of from about 50° C to about 150° C in a reactive medium of an oxyoctadienyl polyether polyol.

The oxyoctadienyl polyether polyol compound is prepared in a separate step by admixing an aliphatic polyol having a functionality of from about 3 to about 6 with an excess of butadiene in the presence of a catalyst system consisting essentially of palladium acetate, triphenylphosphine and zinc acetate at temperatures of about 75° C to about 150° C and at a pressure sufficient to maintain the reactants substantially in liquid phase and separating from the resulting product an oxyoctadienyl polyol having more than one hydroxyl moiety and one or more oxyoctadienyl moieties depending upon the starting polyol. The separated product is then alkoxylated in accordance with well known methods to produce the corresponding oxyoctadienyl polyether polyol.

ETHYLENICALLY UNSATURATED MONOMERS

The monomers useful in forming the infused polymer containing polyols according to the instant invention are the polymerizable ethylenically unsaturated monomers characterized by the presence therein of at least one polymerizable ethylenic group. The monomers can be used singly to produce a homopolymer containing polyol or in combination to produce a copolymer containing polyol composition.

These monomers are well-known in the art and include the hydrocarbon monomers such as butadiene, isoprene, 1,4-pentadiene, 1,6-hexadiene, 1,7-octadiene, styrene, α-methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluorostyrene, iodostyrene, cyanostyrene, nitrostyrene, N,N-dimethylaminostyrene, p-vinyl diphenyl sulfide, p-vinylphenyl phenyl oxide, and the like; the acrylic and substituted acrylic monomers, such as methylacrylate, methyl methacrylate, cyclohexyl methacrylate, benzyl methacrylate, isopropyl methacrylate, octyl methacrylate, methacrylonitrile, methyl α-chloro-acrylate, ethyl α-ethoxyacrylate, butyl acrylate, 2-ethylhexyl acrylate, phenyl acrylate, phenyl methacrylate, α-chloroacrylonitrile, and the like; the vinyl esters and vinyl ethers, such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 2-butoxy-2′-vinyloxy diethyl ether, vinyl 2-ethylmercaptoethyl ether, vinyl methyl ketone, vinyl ethyl ketone, vinyl phenyl ketone, and the like; dimethyl fumarate, dimethyl maleate, monomethyl itaconate, dimethylaminoethyl methacrylate, glycidyl acrylate, dichlorobutadiene, vinyl pyridine, and the like. Any of the known polymerizable monomers which are not reactive with the hydroxyl group can be used and the compounds listed above are illustrative and not restrictive of the monomers suitable for use in this invention.

The ethylenically unsaturated monomers which are preferred in the practice of this invention include the hydrocarbon monomers such as butadiene, isoprene, styrene, α-methylstyrene, and the like; and the acrylic and substituted acrylic monomers which are non-reactive with isocyanato groups, such as methyl acrylate, methyl methacrylate, acrylonitrile, and methacrylonitrile.

Especially preferred in the practice of this invention is a mixture of acrylonitrile with one or more of the previously mentioned hydrocarbon monomers in a ratio of acrylonitrile to co-monomer of from about 1:3 to about 3:1 by weight. For economic reasons, styrene is the most preferred hydrocarbon monomer, and thus the most preferred mixture of monomers for use in the practice of this invention comprises a mixture of acrylonitrile and styrene.

THE OXYALKADIENYL POLYOLS

The oxyalkadienyl polyols useful in the instant invention can be generally characterized as acyclic compounds having at least one oxyalkadienyl moiety and more than one free hydroxy group. These compounds thus can include oxyalkadienyl aliphatic polyols and oxyalkadienyl polyether polyols as more particularly herein described. The oxyalkadienyl aliphatic polyols in accordance with this invention contain one or more oxyalkadienyl moieties covalently bonded to the backbone of an aliphatic initiator which contains more than one free hydroxyl group. These compounds are preferably prepared by intimately contacting an acyclic conjugated diolefin with an acyclic polyol in the presence of the catalyst system comprising a divalent palladium complex and at least one trivalent organophosphine ligand.

In accordance with this method of preparation, the acyclic conjugated olefin undergoes in situ dimerization and simultaneous addition to a polyol hydroxy oxygen. A mixture of oxyalkadienyl alcohol derivatives is obtained depending upon the number of oxyalkadienyl groups added and the polyol. These products range from completely oxyalkadienylated material to that material containing only one oxyalkadienyl moiety.

The polyols useful in preparing the oxyalkadienyl aliphatic polyols are generally acyclic materials having a functionality of from 3 to about 8 and preferably from 3 to about 6. The term functionality as used herein relates to the number of active hydroxy substituents. Any acyclic polyol may be employed which does not contain substituents deleterious to the alkadienyl addition. Preferably the aliphatic chain containing the free hydroxy constituents is a hydrocarbon.

The conjugated diolefins which are useful in preparing the oxyalkadienyl polyols in accordance with the above method are those of the formula:

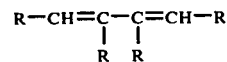

wherein R, independently, is hydrogen, chlorine or a hydrocarbon moiety of from 1 to 10 carbon atoms, selected from the group of alkyl, cycloalkyl, alkenyl, cycloalkenyl, aryl, aralkyl and alkaryl. Preferred conjugated diolefins are those of the formula:

wherein R is as previously defined. Especially preferred in the practice of this invention are conjugated diolefins of the preceding formula wherein R, independently, is hydrogen, chlorine or methyl. Illustrative conjugated olefins include 1,3-butadiene, isoprene, chloroprene, 2,3-dimethyl-1,3-butadiene, and the like. For economic reasons, the most preferred conjugated diolefin employed in the practice of this invention is 1,3-butadiene.

The catalyst system which is employed in preparing the oxyalkadienyl aliphatic polyols in accordance with the above method comprises a divalent palladium compound in admixture with a trisorganophosphine ligand. Preferably an effective amount of a substance which in the presence of the remainder of the reaction system acts as a Lewis acid is also present in the catalyst system. The palladium compounds which are particularly useful are the divalent palladium salts of organic monocarboxylic acids having from 2 to about 8 carbon atoms. Illustrative of such divalent palladium compounds are palladium acetate, palladium propionate, and the like. Especially preferred in the practice of this invention is palladium acetate.

The amount of divalent palladium compound which is employed in the palladium-based catalyst system will depend of course upon the particular conjugated diolefin being oligomerized and the particular polyhydric alcohol to which the oligomerized diolefinic moiety is reacted. Generally, the divalent palladium compound is employed in an amount such that the mole ratio of palladium to conjugated diolefin is from about 0.00001 to about 0.01, with an amount of from about 0.0001 to about 0.001 on the same basis being preferred.

The phosphine ligands which are useful with the divalent palladium-based catalyst system are trisorganophosphines of the general formula:

$$R_3P$$

wherein R, independently, is an organo group having from 1 to 20 carbon atoms, preferably from 1 to 10 carbon atoms, and having only aromatic unsaturation. R is, therefore, alkyl, cycloalkyl, alkaryl, aryl, and aralkyl. R can also be substituted hydrocarbyl, containing, besides atoms of carbon and hydrogen, other atoms such as oxygen, nitrogen and halogen and the like which can be present in functional groups.

In the phosphine ligand as herein defined, the R moieties are the same, or are different, although ligands wherein all R groups are the same are generally preferred for economic reasons. Exemplary ligands include phosphines such as triethylphosphine, tributylphosphine, triphenylphosphine, tris(4-methoxyphenyl)phosphine, tris(4-tolyl)-phosphine, tribenzylphosphine, and the like. In general, phosphine ligands wherein the substituents are aromatic are generally preferred over wholly aliphatic phosphine ligands, and largely because of economic reasons triphenylphosphine is a particularly preferred ligand.

The amount of phosphine ligand which is employed in the divalent palladium-based catalyst system is generally such that the mole ratio of phosphine ligand to divalent palladium compound is from about 1:1 to about 10:1, with a ratio of from about 2:1 to about 5:1 on the same basis being preferred.

The catalyst system additionally preferably employs a compound or complex which acts as a Lewis acid in the presence of the remainder of the reaction medium. This substance can be generally characterized as a promoter which promotes a more stable and more active catalyst system. Lewis acid acting promoters which have been found particularly useful in the catalyst system of this invention include certain metal salts of organic monocarboxylic acids having from 2 to about 8 carbon atoms. The metal salts which have been found suitable as promoters are those of zinc, cadmium, antimony, tin and iron. Illustrative promoters include zinc acetate, cadmium propionate, antimony acetate and the like. Especially preferred as a promoter in the catalyst system of this invention is zinc acetate.

The aforementioned promoters are effective in the catalyst system when employed in a concentration such that the mole ratio of promoter to divalent palladium compound is from about 1:10 to about 10:1, with an amount of from about 1:2 to about 4:1 being preferred.

As previously mentioned, the oxyalkadienyl polyols employed in this invention are formed by the catalyzed in situ oligomerization of the conjugated diolefin in the polyol. In the reaction the diolefin oligomerizes and simultaneously reacts with the hydroxyl group of the polyol. The resulting compound is an unsaturation containing polyol of reduced functionality in which the unsaturation consists of one or more oxyalkadienyl constituents attached to the polyol structure. The reaction is conducted in the liquid phase generally at a temperature of from about 50° C to about 200° C, with a temperature in the range of from about 75° C to about 150° C being preferred. The pressure at which the reaction is carried out is generally that pressure sufficient to maintain the reactants essentially in the liquid phase. Generally, a pressure of from about 15 psig to about 1,000 psig is satisfactory, with a pressure of from about 50 psig to about 500 psig being preferred.

The reaction of the conjugated diolefin to form the corresponding oligomer and the concurrent reaction of the oligomer moiety with the polyol to form the oxyalkadienylated polyol does not require the use of a solvent. However, the reaction can be carried out in the presence of an organic solvent which is inert to the reaction environment. The use of a solvent may be particularly desirable whenever the polyol reactant is of a low order of solubility in the reaction medium, such as for example, when sucrose is the polyol reactant. Also the use of a solvent generally facilitates the reaction by improving the solubility of the conjugated diolefin and the polyol reactant. Illustrative suitable solvents which may be employed in practicing the process include dimethylformamide, dimethylacetamide, N-methylpyrrolidone, and the like.

The reaction herein described between the conjugated diolefin and the polyol to form the unsaturated polyols employed in this invention may be carried out batchwise or as a continuous process. The reaction time required in order to effect the oligomerization of the conjugated diolefin and its reaction with the polyol will depend, of course, upon the particular conjugated diolefin and polyol selected. Generally, a reaction time of from about 1 to about 12 hours is satisfactory, with a reaction time of from about 2 to about 6 hours being preferred.

The crude reaction product obtained by carrying out the reaction of the conjugated diolefin with the polyol, as herein described, comprises unreacted conjugated diolefin, unreacted polyol reactant, the palladium-based catalyst system and a mixture of various reaction products. The unreacted conjugated diolefin and unreacted polyol may be recovered from the crude reaction mixture and recycled for reuse. The catalyst system may be recovered from the crude reaction mixture and likewise recycled for reuse.

The composition of the products contained in the crude reaction mixture will, of course, depend upon the starting materials employed in practicing this invention. The oxyalkadienylated polyols formed as the result of this invention are alcohols of reduced functionality compared with the starting polyol due to the conversion of one or more of the hydroxyl groups to the corresponding oxyalkadienyl derivative. Moreover, the reaction product will contain a mixture of the mono-, di-, etc. oxyalkadienyl derivatives of the polyol.

The oxyalkadienyl polyether polyols of the instant invention are prepared in one of two ways. According to the first method, an oxyalkadienyl aliphatic polyol is prepared as described herein above. The reaction product is then alkoxylated in accordance with well known procedures with an alkoxylation a catalyst such as an alkali metal hydroxide. The alkoxylation is continued until a product of desired molecular weight is obtained. In accordance with this first method, the oxyalkadienyl moiety(ies) are directly attached to the backbone of the polyhydric initiator.

In accordance with the second method, the polyol initiator is first alkoxylated as above described and the resulting polyether polyol is then alkadienylated as herein before described. In accordance with this second method, the oxyalkadienyl moiety(ies) are attached at the termination of a polyether chain. It will be realized by the skilled artisan that a combination of these methods can be employed such that, for example, the polyol initiator is initially alkoxylated, then alkadienylated, and then further alkoxylated.

Whether the first method, the second or a combination is employed, the alkoxylation can be carried out with an alkylene oxide such as ethylene oxide, propylene oxide and butylene oxide, or mixtures thereof in the presence of an alkoxylation catalyst. The addition may be heteric, block or a combination thereof. When primary hydroxy "capping" is desired, the product is reacted with ethylene oxide in order to acquire necessary primary hydroxyl group termination of the polyether chains. This process is described in U. S. Pat. No. 3,336,242 for example.

Preferred aliphatic polyols are trimethylolpropane, glycerol, 1,2,6-hexanetriol, sorbitol, pentaerythritol, sucrose and the like. Preferred polyether polyols which are formed prior to alkadienylation include polyols having a functionality of from 3 to about 6 and having a molecular weight of from about 2,000 to about 10,000. The polyether polyols are present in the formula:

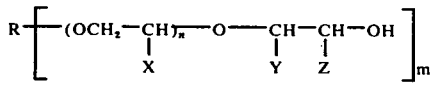

wherein R is the nucleus of an aliphatic polyhydric initiator having from 3 to about 12 carbon atoms and from 3 to 8 hydroxyl groups, Z is an alkyl radical of from 1 to 4 carbon atoms, X and Y, independently, are hydrogen or Z, $n$ has an average value of from 0 to about 50, and $m$ is from 3 to 8, corresponding to the number of hydroxyl groups.

The preferred polyether polyols are the polyether triols having a molecular weight of from about 4,000 to about 7,000, and having from about 25 percent to about 75 percent primary hydroxyl groups. Although triols having molecular weights of about 3,000 can be used to produce a flexible polyurethane foam, it has been found that the foam produced has significantly more closed cells and the foams themselves are not as resilient. These polyols may be used alone, in combination, or in a mixture with other polyether polyols.

THE REACTION CONDITIONS

The infused polymer containing polyols of the instant invention are prepared by the in situ polymerization of the ethylenically unsaturated monomer(s) in a reactive medium comprising the oxyalkadienylated aliphatic polyol or the oxyalkadienylated polyether polyol or mixtures thereof at a temperature of from about 50° C to about 150° C in the presence of a catalytically effective amount of a conventional free radical catalyst known to be suitable for the polymerization of ethylenically unsaturated monomers. The concentration of the catalyst can vary from about 0.25 to about 2.5 percent, with an amount of from about 1.0 to about 2.0 percent being preferred. However, any effective catalytic amount is satisfactory.

Illustrative free radical catalysts which are effective in the practice of this invention are, for example, the peroxides and the azo compounds, including benzoyl peroxide, acetyl peroxide, t-butyl peroxide, α-cumyl peroxide, propyl peroxide, isopropyl peroxide, isopropyl-t-butyl peroxide, t-butyl lauryl peroxide, furoyl peroxide, triphenylmethyl peroxide, p-methoxy-benzoyl-peroxide, p-monomethylbenzoyl peroxide, t-butyl peroxybenzoate, diethyl peroxyterephthalate, α,α'-azo-2-methylbutyronitrile, α,α'-azo-2-methyl heptonitrile, 1,1'-azo-1-cyclohexane carbonitrile, dimethyl α-α'-azo-isobutyrate, azobisisobutyronitrile, and the like. The preferred free radical catalysts are the azo compounds, and especially preferred is azobisisobutyronitrile.

The amount of ethylenically unsaturated monomer, which is polymerized and incorporated into the polymer polyether polyols of this invention will vary, depending upon the particular monomers employed, as well as upon the properties desired in the polyurethane composition which is to be prepared from the polymer polyether polyol. In general, the ethylenically unsaturated monomer comprises from about 5 to about 25 percent by weight of the polymer polyether polyol composition, with an amount of from about 10 to about 20 percent by weight being preferred.

In carrying out the aforementioned in situ polymerization, the monomer(s) is added to the oxyalkadienyl polyol composition along with the selected free radical polymerization catalyst, and the polymerization reaction is allowed to proceed under an inert atmosphere at a temperature of from about 50° C to about 150° C until the polymerization reaction is completed. In another embodiment of this invention, the desired monomer(s) is added to the polyol composition incrementally over a period of time in order to control the rate at which the polymerization reaction proceeds. At the end of the polymerization reaction, the unreacted monomers are then removed from the polymer polyether polyol composition, as for example, by vacuum stripping.

The infused polymer containing polyol compositions of this invention are particularly useful in preparing fast curing polyurethane foams of improved physical properties. Polyurethane foams prepared according to this invention are the reaction products of a free isocyanate containing component and a reactive hydroxy containing component. The foam is produced by conducting the above reaction catalytically in the presence of water, and optionally an inert blowing agent.

The active hydroxy containing component comprises a polyether polyol and the infused polymer containing polyol of this invention. The infused polymer containing polyol is generally employed in an amount of from about 5 to about 50 wt. % of the total polyol content of the active hydroxy containing component, with an amount of from about 10 to about 25 wt. % being preferred.

The polyether polyol employed in this component can include polyols having a functionality of from 2 to about 6, and having a molecular weight of from about 2,000 to about 10,000. These polyether polyols include the same polyether polyols herein described as useful in the preparation of the oxyalkadienyl polyol compositions.

The preferred polyether polyols are the polyether diols and triols having a molecular weight of from about 2,000 to about 7,000, and having from about 25% to about 90% primary hydroxyl groups. These polyols can be used alone, in combination, or in admixture with other polyether polyols.

Especially preferred polyether polyols are the polyether triols having a molecular weight of from about 4,000 to about 7,000, and from about 40% to about 80% primary hydroxyl groups. Triols having molecular weights of about 3,000 can be used to produce a flexible polyurethane foam but are not preferred.

Preferred polyether diols are, for example, polypropylene glycols or mixed polypropylene glycolpolyethylene glycol copolymers having a molecular weight from about 2,000 to about 5,000. These materials are produced by reacting ethylene oxide, propylene oxide, or a butylene oxide, either sequentially or in admixture with an initiator such as, for example, ethylene glycol, propylene glycol or butylene glycol.

The active hydroxy containing component previously above described, is reacted with the free polyisocyanate containing component in order to produce the instant inventive polyurethane compositions.

The free isocyanate containing component can be generally described as an organic polyisocyanate. Suitable organic polyisocyanates are those organic diisocyanates, triisocyanates and polyisocyanates well-known to those skilled in the polyurethane art. Mixed isomers of toluene diisocyanate which are readily available commercially, such as those described in U.S. Pat. No. 3,298,976 may be used. Preferred are diisocyanates and higher functionality polyisocyanates prepared by the phosgenation of the reaction product of aniline and formaldehyde, such as diphenylmethane diisocyanate in its various isomeric forms, and higher functionality polymethylene polyphenyl polyisocyanates such as those described in U.S. Pat. No. 3,362,979 for example. These polymethylene polyphenyl polyisocyanates generally have an average functionality of from greater than 2.0 to about 3.3. An especially preferred organic polyisocyanate useful in the practice of our invention is the polymethylene polyphenyl polyisocyanate having a functionality of from about 2.2 to about 2.8.

In producing the polyurethane compositions of the invention, the free isocyanate containing component and the hydroxy containing component are combined such that the resulting ratio of isocyanate groups to hydroxyl groups, known as the isocyanate index, ranges from about 0.9:1 to about 1.4:1. It is preferred that the isocyanate index ranges from about 0.95:1 to about 1.3:1. It is within these ranges that the most desirable balance of advantageous physical properties and ambient temperature curing properties are achieved for the solid polyurethane elastomer products.

It has also been found desirable in many instances to include in the polyurethane formulation a cross-linker or chain extender. Traditionally, a number of cross-linkers or chain extenders have been employed in semi-flexible integral skin foams and elastomers. Such materials have also been used in some instances to prepare flexible foams, and the like. Conventional cross-linkers include aliphatic diols or polyols such as ethylene glycol, 1,4-butanediol, glycerol, glycerolalkylene oxide adducts, trimethylolpropane, trimethylolpropane-alkylene oxide adducts, pentaerythritol-alkylene oxide adducts, sorbitol-alkylene oxide adducts, and the like. Amine cross-linkers commonly employed are triethanolamine, and its alkylene oxide adducts; alkylene oxide adducts of ethylenediamine, alkylene oxide adducts of diethylenetriamine; and the like. Other cross-linkers such as those disclosed in U.S. Pat. Nos. 3,382,284 and 3,072,582 can be suitably employed. Alkylene oxide adducts of aniline, methylene dianiline, chlorinated methylene dianiline and chlorinated benzidine are other representative cross-linkers. Chain extenders prepared by reacting monoalkanolamines with ethylene carbonate or propylene carbonate, as described in U.S. Pat. No. 3,595,814, can also be employed.

Desirably, the polyurethane formulation will include a suitable catalyst to promote one or more of the various possible reactions. Depending upon the type of urethane composition desired, the skilled artisan will readily be able to select the appropriate catalytic material. Triethylenediamine; N-methyl- or N-ethylmorpholine; N,N-dimethylcyclohexylamine; N,N-di-methylethanolamine; N,N'-dimethylpiperazine; trimethylamine; N,N'-bis (2-hydroxypropyl)-2 methyl piperazine; trimethylaminoethyl piperazine; N,N,N',N'-tetramethyl-1,3-propanediamine; tertiary polyoxyalkylene polyamines, as described in U.S. Pat. No. 3,660,319; 2-dimethylaminoethyl-3-dimethylaminopropyl ether; 2,2'-dimorpholinodiethyl ether; other amines as described in U.S. Pat. No. 3,330,782; and amine catalysts described in U.S. Pat. Nos. 2,941,967; 3,645,925; 3,661,808; and 3,313,744 are exemplary amine catalysts. Organometallic catalysts can also be used in combination with the amine catalyst or independently thereof. Organometallic compounds such as dibutyltin dilaurate; dibutyltin dioctoate; dioctyltin oxide; dimethyltin diacetate; phenylmercuric propionate; stannous octoate, and such organometallic catalysts as are described in U.S. Pat. Nos. 3,592,787; 3,419,509; 3,583,945; 3,398,106; 3,397,158; 3,075,927 and 3,084,177 are representative.

Polyurethane formulations of the instant invention which are employed in the preparation of polyurethane foams will include blowing agents. Preferably, a small amount of surfactant is employed in conjunction with the blowing agent. The blowing agent can be any of those known to be useful for this purpose, e.g., water, halogenated hydrocarbons, hydrocarbons, and the like. Flexible and semi-flexible foams are conventionally blown with carbon dioxide from the water-isocyanate reaction or a combination of water and a volatile blowing agent. The water level in such instances is generally in the range of about 1.5 to about 4.5 parts by weight based on the weight of the polyurethane formulations and the volatile blowing agent level in such instances is generally in the range of 0 to 20 parts by weight depending, of course, on the density and hardness desired. Integral skin foams are generally blown with only an inert blowing agent. Generally, an amount in the range of about 5 to about 25 parts by weight, depending upon the density desired, is employed. Gas or gas producing materials which include the lower molecular weight alkanes, alkenes, dialkyl ethers, halogenated hydrocarbons, and the like, are suitable volatile blowing agents. Monofluorotrichloromethane; difluorodichloromethane; 1,1,2-trichloro, 1,2,2trifluoroethane, dichlorotetrafluoroethane; methylene chloride and ethyl chloride are representative halogenated hydrocarbons.

Silicone oils such as those described in U.S. Pat. Nos. 2,834,748; 3,313,744 and 3,647,724 are representative surfactants that can be employed in preparing polyurethane foams. Depending on the properties and the utility desired of the polyurethane composition, various other compounds can be utilized. For example, various additives such as talc, mica, clay, titanium dioxide, carbon black, wood pulp, silica, barium sulfate, calcium carbonate, dyes, asbestos, fibrous glass, synthetic fibers, and the like, can be employed in the polyurethane formulation as fillers or for other purposes. Paraffin oils, castor oil, polyvinyl chloride, and other materials have been conventionally included, as well. The addition of other antioxidants or stabilizers, plasticizers, emulsifiers, wetting agents, smoke-inhibiting agents, fire retardants, and the like, can be employed as well.

The invention will be further illustrated by the following specific examples, which are given by way of illustration and not as limitations on the scope of this invention.

EXAMPLE I

Into a 300 ml capacity autoclave were charged 42.0 g glycerine (0.46 moles), 50 ml dimethylformamide, and a catalyst system comprising 0.25 g palladium acetate, 3.6 g zinc acetate and 1.0 g triphenylphosphine. Thereafter, 108.0 g of 1,3-butadiene (2.0 moles) was added to the autoclave and the contents of the autoclave were then heated to 90°–110° C. Initially, the autogenous pressure was approximately 310 psig and during the 2½ hours the autoclave was maintained at this temperature, the pressure decreased gradually to 150 psig. The autoclave was then cooled and a pale yellow reaction mixture was recovered from the autoclave. The crude product was filtered. The filtrate was subjected to distillation at 1.4 mm Hg at a pot temperature of 120° C to effect removal of low boiling materials. The pot residue was found to contain a mixture of mono-octadienyl ether of glycerine and di-octadienyl ether of glycerine. The presence of these products was confirmed by nuclear magnetic resonance (NMR), infrared spectroscopic (IR), gas-liquid chromatographic (GLC) and gel permeation chromatographic (GPC) techniques.

EXAMPLE II

Into a 1 liter stirred stainless steel autoclave were charged 276 g glycerine (3.0 moles), 100 ml dimethylformamide and a catalyst system consisting of 0.75 g palladium acetate, 5.4 g zinc acetate and 3.0 g triphenylphosphine. After flushing the autoclave with nitrogen, 262 g of 1,3-butadiene (4.85 moles) was pressured in and the resulting reaction mixture heated at 90°–115° C for 2¼ hours. Thereafter, the autoclave was cooled and the contents were filtered. The resulting pale yellow filtrate was subjected to distillation at 0.5 mm Hg pressure and a pot temperature of 80° C. The pot residue was extracted with 700 ml of ethyl acetate and thereafter extracted with 300 ml of ethyl alcohol. This product was flashed with the aid of a very short-path distillation unit at 0.2 mm Hg pressure and a pot temperature of 117°–133° C. The resulting product was analyzed by NMR, IR, GLC and GPC techniques.

The data obtained for this residue confirmed that the major component of the reaction product was the mono-octadienyl ether of glycerine. Also present was a minor proportion of the di-octadienylether of glycerine.

EXAMPLE III

According to the general procedure of Example II, a mixture of 268.4 g of the trimethylolpropane (2.0 moles), 200 ml dimethylformamide, 270 g of 1,3-butadiene (5.0 moles) and a catalyst system comprising 0.75 g palladium acetate, 1.5 g zinc acetate and 3.5 g of triphenylphosphine was heated at 115° C. The initial pressure of 400 psig dropped over a period of about 1 hour to approximately 100 psig. The reaction was continued for 6 hours at 115° C with an additional pressure decrease to about 70 psig. The crude reaction product was cooled and then filtered. The filtrate was stripped of low boiling components at 110° C pot temperature and 6 mm Hg. Hydroxyl number and iodine number, NMR, IR, GLC and GPC analysis confirmed the presence of mono-octadienyl ether of trimethylolpropane as the major constituent of the residue. The dioctadienyl ether of trimethylolpropane was present in a lesser amount.

EXAMPLE IV

According to the general procedure of Example II, a mixture of 1810 g of trimethylolpropane, 300 ml dimethylformamide and a catalyst system comprising 3.0 g palladium acetate, 5.0 g zinc acetate and 10.0 g triphenylphosphine was charged into a clean, dry nitrogen-purged autoclave. The autoclave was sealed and heated to approximately 115° C. Then 1620 g of 1,3-butadiene was incrementally added over a period of about 40 minutes. During a digesting period of about 1¼ hours at 115° C, the pressure decreased from 240 psig to 37 psig. The crude product was then recovered and filtered. The filtrate was stripped of light boiling materials at reduced pressure (1 mm Hg, pot temperature 75° C). The pot residue (2882 g) had an iodine number of 207 and a hydroxyl number of 416. The spectral data (NMR, IR and GLC) confirmed the presence of the mono-octadienyl ether of trimethylolpropane and the di-octadienyl ether of trimethylolpropane.

EXAMPLE V

This example illustrates the preparation of an alkylene oxide adduct of the oxyoctadienyl derivative of glycerine.

Into a ½ gallon stirred autoclave were charged 160 g of the octadienyl ether derivative of glycerine prepared according to Example II and 6.4 g of 50% aqueous potassium hydroxide. The reactor was then evacuated and purged with pre-purified nitrogen. Water was then evaporated from the mixture by vacuum stripping to a minimum pressure at 100° C. This was followed by nitrogen stripping for ½ hour. Thereafter, 570 g of propylene oxide was introduced into the autoclave over a 4 hour period at 100°–115° C and 60 psig. The reaction mixture was then digested two hours to an equilibrium pressure. The crude alkaline product was neutralized at 95° C with 16 g of 25% aqueous oxalic acid. Also added were 0.3 g of di-t-butyl p-cresol and 3.0 g of a filter aid. The neutralized product was then vacuum stripped under minimum pressure at 100° C, nitrogen stripped and filtered at 110°–120° C. The finished product has the following properties:

| | |
|---|---|
| Acid no., mg KOH/g | 0.46 |
| Hydroxyl no., mg KOH/g | 138 |
| Water, wt. % | 0.049 |
| pH in 10:1 methanol-water | 8.2 |
| Sodium, ppm | 1.3 |
| Potassium, ppm | 16.0 |

EXAMPLE VI

This example illustrates the preparation of an ethylene oxide capped propoxylated oxyoctadienyl polyol.

Into a ½ gallon autoclave were placed 175 g of the propylene oxide polyol adduct of Example V and 14.8 g of 50% aqueous potassium hydroxide. The autoclave was then evacuated, purged with pre-purified nitrogen and water evaporated from the mixture by vacuum stripping to a minimum pressure at 100° C. This was followed by nitrogen stripping for ½ hour. Then, 1400 g of propylene oxide was introduced into the autoclave and reacted at 110°–115° C and 60 psig pressure. Approximately 3 to 4 hours were required for addition of the propylene oxide. After digestion to an equilibrium pressure, the reaction mixture was stripped with nitrogen for 15 minutes. Then 261 g of ethylene oxide was added at 110°–115° C. and 60 psig pressure over a 1 hour period. After digestion to an equilibrium pressure, the alkaline product was neutralized at 95° C with 57.6 g of 25% aqueous oxalic acid. At this time, 1.65 g of di-t-butyl p-cresol and 3.0 g of a filter aid were added. The neutralized product was then vacuum stripped to a minimum pressure at 100° C, nitrogen stripped and filtered at 110°–120° C. The finished product had the following properties:

| | |
|---|---|
| Acid no., mg KOH/g | 0.39 |
| Hydroxyl no., mg KOH/g | 25.5 |
| Water, wt. % | 0.057 |
| Viscosity, 25°C, cps | 965 |
| Unsaturation, meq/g | 0.29 |
| Sodium, ppm | 0.9 |
| Potassium, ppm | 5.3 |

EXAMPLE VII

This example will illustrate the preparation of an infused styrene-acrylonitrile containing polyol employing the 25.5 hydroxyl number ethylene oxide-capped polyol of Example VI.

Into a 1 liter, three-necked flask equipped with a stirrer, thermometer, dropping funnel, water condenser, and an inlet and outlet for nitrogen was charged 450 g of the ethylene oxide-capped propoxylated oxyoctadienyl polyol of Example VI. With stirring, the polyol was heated to 90° C and 50 g styrene, 50 g acrylonitrile, and 10 g azobisisobutyronitrile was then added dropwise over a 4.5 hour period. The temperature during the addition was maintained at 90°–100° C. This was followed by a two-hour digestion period. The resultant product was an opaque, cream colored, viscous liquid. Unreacted monomer was then removed by vacuum stripping at 100°–120° C at 2 mm Hg. Monomer conversion was 94.3%. The infrared spectrum of the product showed the presence of nitrile at 4.46 microns and monosubstituted aromatic at 13.15 and 14.25 microns. The finished product had the following properties:

| | |
|---|---|
| Acid no., mg KOH/g | 0.12 |
| Hydroxyl no., mg KOH/g | 23.5 |
| Water, wt. % | 0.014 |
| Viscosity, 25°C, cps | 2250 |
| Unsaturation, meq/g | 0.22 |

EXAMPLE VIII

This example illustrates the utility of the infused polymer containing polyol of Example VII in the preparation of a highly resilient urethane foam. It will further show that the foam incorporating the infused polymer containing polyol prepared from the unsaturated polyol of this invention cures faster and has improved physical properties—particularly tensile strength, tear strength and elongation — compared with a polyurethane foam prepared using only a conventional high reactivity polyol as the polyol component. The conventional high reactivity polyol employed in preparing the foam compositions of this example was a 5500 molecular weight adduct of trimethylolpropane with ethylene oxide and propylene oxide (THANOL SF-5503, Jefferson Chemical Company, Houston, Texas), having a hydroxyl number of from about 32 to about 36. The data presented in the following table shows that the incorporation of as little as 10 wt. % of the infused polymer containing polyol of this invention into the active hydroxy component employed in preparing the polyurethane foam results in a flexible foam having improved physical properties. Formulations, details of preparation and foam properties are shown in the following Table 1.

Table 1

| Foam no. | 8A | 8B | 8C | 8D |
|---|---|---|---|---|
| Formulation, pbw. | | | | |
| THANOL SF-5503, polyol[a] | 100 | 90 | 75 | 60 |
| Infused polymer containing polyol[b] | — | 10 | 25 | 40 |
| Water | 2.7 | 2.7 | 2.7 | 2.7 |
| Silicone surfactant[c] | 2.0 | 2.0 | 2.0 | 2.0 |
| DABCO LV-33[d] | 0.3 | 0.3 | 0.3 | 0.3 |
| THANCAT DM-70[e] | 0.25 | 0.25 | 0.25 | 0.25 |
| NIAX A-I[f] | 0.12 | 0.12 | 0.12 | 0.12 |
| Dibutyltin dilaurate | 0.02 | 0.02 | 0.02 | 0.02 |
| 80/20 Toluene diisocyanate/PAPI[g] | 36.0 | 36.0 | 36.0 | 36.0 |
| Isocyanate index | 1.05 | 1.05 | 1.05 | 1.05 |
| Details of Preparation | | | | |
| Cream time, sec. | 8 | 8 | 8 | 8 |
| Rise time, sec. | 165 | 165 | 165 | 160 |
| Gel time, sec. | 480 | 450 | 495 | 435 |
| Properties | | | | |
| Density, pcf. | 2.4 | 2.3 | 2.3 | 2.3 |
| Tensile, psi. | 10.9 | 12 | 13 | 14 |
| Elongation, % | 127 | 150 | 147 | 157 |
| Tear, pli | 1.2 | 1.9 | 2.2 | 2.1 |
| Compression set (Method B) | | | | |
| 50% | 24.3 | 28.5 | 28.4 | 29.0 |
| 75% | 18.0 | 29.2 | 25.4 | 30.1 |
| Humid Aging (5 hrs. at 250° F) | | | | |

Table 1-continued

| Foam no. | 8A | 8B | 8C | 8D |
|---|---|---|---|---|
| Compression set, 50% | 27.1 | 35.7 | 45.3 | 44.7 |
| CLD loss, 50% | 29.7 | 21.4 | 19.5 | 18.0 |

Annex to Table 1

[a]A 5500 molecular weight high reactivity polyether triol formed as an adduct of trimethylol propane with ethylene oxide and propylene oxide and having a hydroxyl no. of 32–36; Jefferson Chemical Co.
[b]The polyol prepared in Example VII, hydroxyl no. 23.5
[c]Silicone L-5303, Union Carbide Chemical Corp.
[d]33% triethylenediamine in dipropylene glycol; Air Products.
[e]A blend of dimorpholinodiethyl ether and N,N'-dimethylpiperazine, Jefferson Chemical Co.
[f]Dimethylaminoethyldimethylaminoethylether, Union Carbide Chemical Corp.
[g]A polymethylene polyphenyl polyisocyanate having a functionality of 2.7; Upjohn Co.

EXAMPLE IX

This example will demonstrate that highly resilient polyurethane foams are prepared when employing the infused polymer containing polyol. The prepared foams exhibit improved properties over those prepared from a high reactivity polyether and a commercially available prior art polymer/polyol mixtures. Formulations, details of preparation and foam properties are shown in the following Table 2.

Table 2

| Foam no. | 9A | 9B | 9C | 9D |
|---|---|---|---|---|
| Formulation, pbw | | | | |
| THANOL SF-5503 polyol[a] | 50 | 90 | 75 | 60 |
| Prior art polymer-/polyol[b] | 50 | — | — | — |
| Infused polymer containing polyol[c] | — | 10 | 25 | 40 |
| Water | 2.7 | 2.7 | 2.7 | 2.7 |
| Silicone surfactant[d] | 2.0 | 2.0 | 2.0 | 2.0 |
| DABCO LV-33[e] | 0.3 | 0.3 | 0.3 | 0.3 |
| NIAX A-I[f] | 0.12 | 0.12 | 0.12 | 0.12 |
| THANCAT DM-70[g] | 0.25 | 0.25 | 0.25 | 0.25 |
| Dibutyltin dilaurate | 0.02 | 0.02 | 0.02 | 0.02 |
| 80/20 Toluene diisocyanate/PAPI[h] | 36.0 | 36.4 | 36.2 | 35.8 |
| Isocyanate index | 1.05 | 1.05 | 1.05 | 1.05 |
| Details of Preparation | | | | |
| Cream time, sec. | 8 | 8 | 8 | 8 |
| Rise time, sec. | 150 | 120 | 120 | 120 |
| Gel time, sec. | 480 | 390 | 420 | 420 |
| Properties | | | | |
| Density, pcf. | 2.5 | 2.5 | 2.6 | 2.8 |
| Tensile, psi. | 21 | 16 | 18 | 21 |
| Elongation, % | 122 | 170 | 137 | 155 |
| Tear, pli | 1.8 | 2.2 | 2.1 | 2.3 |
| Compression set (Method B) | | | | |
| 50% | 19.6 | 24.8 | 28.0 | 27.6 |
| 75% | 16.7 | 20.9 | 24.0 | 24.6 |
| Humid aging (5 hrs. at 250° F) | | | | |
| Compression set, 50% | 30.1 | 19.2 | 31.8 | 34.8 |
| CLD loss, 50% | 30.8 | 30.1 | 27.4 | 21.2 |

Annex To Table 2

[a]A 5500 molecular weight high reactivity polyether triol formed as an adduct of trimethylol propane with ethylene oxide and propylene oxide and having a hydroxyl no. of 32–36; Jefferson Chemical Co.
[b]Pluracol P-581; a polymer/polyol having a hydroxyl no. of 26; BASF Wyandotte Chemical Co.
[c]The polyol prepared in Example VII; hydroxyl no. 23.9
[d]Silicone L-5303; Union Carbide Chemical Co.
[e]33% triethylenediamine in dipropylene glycol; Air Products.
[f]Dimethylaminoethyldimethylaminoethyl ether; Union Carbide Co.
[g]A blend of dimorpholinodiethyl ether and N,N'-dimethylpiperazine; Jefferson Chemical Co.
[h]A polymethylene polyphenyl polyisocyanate having a functionality of 2.7; Upjohn Co.

While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. An infused polymer containing polyol composition having at least one polymer chain chemically bonded through at least one unsaturation site of an oxyalkadienyl containing polyhydric compound selected from the group consisting of oxyalkadienyl aliphatic polyols, oxyalkadienyl polyether polyols and mixtures thereof wherein said polymer chain is the polymerization product of at least one polymerizable ethylenically unsaturated monomer.

2. The infused polymer containing polyol composition of claim 1 wherein said polymeric chain is the polymerization product of at least one polymerizable ethylenically unsaturated monomer selected from the group consisting of vinyl chloride, vinyl acetate, methyl methacrylate, acrylonitrile and styrene; and wherein said oxyalkadienyl containing polyhydric compound is an oxyoctadienyl polyether polyol.

3. The infused polymer containing polyol composition of claim 2 wherein said polymerizable ethylenically unsaturated monomer is a mixture of acrylonitrile and a co-monomer selected from the group consisting of vinyl acetate, vinyl chloride, methyl methacrylate, and styrene in a weight ratio of acrylonitrile to said co-monomer of from about 3:1 to about 1:3, and wherein said oxyoctadienyl polyether polyol is the alkadienylation product of 1,3-butadiene and a polyether polyol of the formula

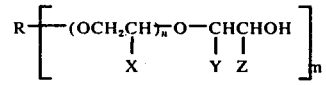

wherein R is the nucleus of an aliphatic polyhydric initiator having from 3 to about 12 carbon atoms and from 3 to 8 hydroxyl groups, z is an alkyl radical of from 1 to 4 carbon atoms, x and y, independently, are hydrogen or z, n has an average value of from 0 to about 50 and m is from 3 to 8 corresponding to the number of hydroxyl groups wherein said polyether polyol of the above formula has a molecular weight of from about 2,000 to about 10,000.

4. The infused polymer containing polyol composition of claim 3 wherein said polymerizable ethylenically unsaturated monomer is a mixture of acrylonitrile and styrene; and wherein said polyether polyol is a polyether triol having molecular weight of from about 4,000 to about 7,000 and having from about 25% to about 75% primary hydroxyl group termination.

5. The method of preparing an infused polymer containing polyol comprising the in situ polymerization of at least one polymerizable ethylenically unsaturated monomer in a reactive medium comprising an oxyalkadienyl containing polyhydric compound selected from the group consisting of oxyalkadienyl aliphatic polyols, oxyalkadienyl polyether polyols and mixtures thereof and an effective amount of a free radical catalyst.

6. The method of claim 5 wherein said polymerizable ethylenically unsaturated monomer is selected from the group consisting of vinyl chloride, vinyl acetate, methyl methacrylate, acrylonitrile and styrene and is present in an amount of from about 5 to about 25 weight percent of said oxyalkadienyl containing polyhydric compound.

7. The method of claim 6 wherein said polymerizable ethylenically unsaturated monomer is a mixture of acrylonitrile and a co-monomer selected from the group of vinyl acetate, vinyl chloride, methyl methacrylate and styrene in a weight ratio of acrylonitrile to co-monomer of from about 3:1 to about 1:3 and wherein said oxyalkadienyl containing compound is an oxyoctadienyl polyether polyol.

8. The method of claim 7 wherein said ethylenically unsaturated monomer is a mixture of acrylonitrile and styrene and said oxyoctadienyl polyether polyol is the alkadienylation product of 1,3-butadiene and a polyether polyol of the formula

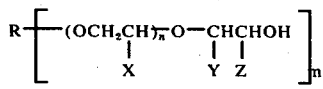

wherein R is the nucleus of an aliphatic polyhydric initiator having from 3 to about 12 carbon atoms and from 3 to 8 hydroxyl groups, z is an alkyl radical of from 1 to 4 carbon atoms, x and y, independently, are hydrogen or z, n has an average value of from 0 to about 50 and m is from 3 to 8 corresponding to the number of hydroxyl groups wherein said polyether polyol of the above formula has a molecular weight of from about 2,000 to about 10,000.

9. The method of claim 8 wherein said polymerizable monomer mixture is present in an amount of from about 10 to about 20 weight percent.

10. A method of producing an infused polymer containing polyol composition comprising the steps of:
contacting a polyhydric composition selected from aliphatic polyols having from 3 to about 12 carbon atoms and from 3 to about 8 hydroxyl groups, and polyether polyols of the formula

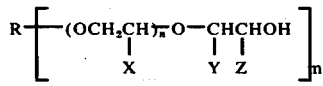

wherein R is the nucleus of an aliphatic polyhydric initiator having from 3 to about 12 carbon atoms and from 3 to 8 hydroxyl groups, z is an alkyl radical of from 1 to 4 carbon atoms, x and y, independently, are hydrogen or z, n has an average value of from 0 to about 50 and m is from 3 to 8 corresponding to the number of hydroxyl groups wherein said polyether polyol of the above formula has a molecular weight of from about 2,000 to about 10,000, with 1,3-butadiene in the presence of catalytically effective amount of a catalyst system consisting essentially of a divalent palladium complex at least one trivalent organophosphine ligand and an effective amount of a substance which in the presence of the remainder of the reaction system acts as a Lewis acid at a temperature of from about 50° C to about 200° C and a pressure sufficient to maintain the reactants and by-products in liquid phase to produce an oxyoctadienyl polyhydric compound; and,
admixing and polymerizing at least one polymerizable ethylenically unsaturated monomer in a reactive medium comprising said oxyoctadienyl polyhydric composition and a catalytically effective amount of a free radical polymerization catalyst at temperatures of from about 50° C to about 150° C.

11. The method of claim 10 wherein said polyhydric composition is said aliphatic polyol, comprising the further step of:
alkoxylating said oxyoctadienyl polyhydric composition prior to said polymerization step with an amount of an alkylene oxide, selected from propylene oxide, ethylene oxide, butylene oxide and mixtures thereof, sufficient to produce an oxyoctadienyl polyether polyol of a molecular weight from about 2,000 to 10,000 in the presence of a catalytically effective amount of an alkali metal hydroxide alkoxylation catalyst.

12. A polyurethane composition prepared by admixing and reacting an organic free polyisocyanate containing component, a reactive polyhydroxy containing component and an effective amount of an infused polymer containing polyol composition having at least one polymeric chain chemically bonded through at least one unsaturation site of an oxyalkadienyl polyether polyol wherein said polymeric chain is the polymerization product of at least one polymerizable ethylenically unsaturated monomer.

13. The polyurethane composition of claim 12 further comprising an effective amount of a suitable catalyst and a blowing agent wherein said effective amount of an infused polymer containing polyol composition is an amount from about 5 to about 50 wt. % based on the weight of said reactive polyhydroxy containing component and wherein the ratio of free polyisocyanate containing component to reactive polyhydroxy containing component is such that the isocyanate index is from about 0.9 to about 1.3.

14. The polyurethane composition of claim 13 wherein said organic free polyisocyanate containing component is selected from diisocyanates and higher functionality polyisocyanates prepared by the phosgenation of the reaction product of aniline and formaldehyde having a functionality of from greater than 2.0 to about 3.3; wherein said reactive polyhydroxy containing component is a polyether polyol having molecular weight of from about 2,000 to about 7,000; wherein said polymeric chain is the polymerization product of at least one polymerizable ethylenically unsaturated monomer selected from the group consisting of vinyl chloride, vinyl acetate, methyl methacrylate, acrylonitrile and styrene; and wherein said oxyalkadienyl polyether polyol is an oxyoctadienyl polyether polyol.

15. The polyurethane composition of claim 14 wherein said polymerizable ethylenically unsaturated monomer is a mixture of acrylonitrile and a co-monomer selected from the group consisting of vinyl acetate, vinyl chloride, methyl methacrylate and styrene in a weight ratio of acrylonitrile to said co-monomer of from about 3:1 to about 1:3 and wherein said oxyoctadienyl polyether polyol is the octadienylation product of 1,3-butadiene and a polyether polyol of the formula

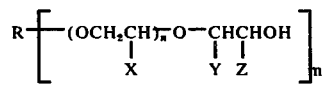

wherein R is the nucleus of an aliphatic polyhydric initiator having from 3 to about 12 carbon atoms and from 3 to 8 hydroxy groups, z is alkyl radical of from 1 to 4 carbon atoms, x and y, independently, are hydrogen or z, n has an average value of from 0 to about 50 and m is from 3 to 8 corresponding to the number of hydroxyl groups wherein said polyether polyol of the above formula has a molecular weight of from about 2,000 to about 10,000.

16. The polyurethane composition of claim 15 wherein said blowing agent is selected from water and mixtures of water and an inert blowing agent; wherein said reactive polyhydroxy containing component contains from about 25% to about 90% primary hydroxy groups; wherein said polymerizable ethylenically unsaturated monomer is a mixture of acrylonitrile and styrene; and wherein said polyether polyol is a polyether triol having a molecular weight of from about 4,000 to 7,000 and having from about 25% to 75% primary hydroxyl group termination.

17. A flexible polyurethane foam prepared by admixing and reacting
 a free isocyanate containing component of a mixture of 80% by weight toluene diisocyanate and 20% by weight of a phosgenated aniline-formaldehyde condensation product, the mixture having a functionality of from about 2.2 to 2.8;
 a reactive polyhydroxy containing component of a polyether triol having a molecular weight of from about 4,000 to 7,000 and having from 40% to about 80% primary hydroxyl termination;
 from about 10% to 25% by weight based on the weight of the polyether polyol of an infused polymer containing polyol composition in the presence of a catalytically effective amount of triethylenediamine and an effective amount of water utilized as a blowing agent;
 wherein the ratio of the free polyisocyanate containing component to the reactive polyhydroxy containing component is such that the isocyanate index is from about 0.9 to about 1.3; and
 wherein said infused polymer containing polyol composition is prepared by the in situ free radical catalyzed polymerization of acrylonitrile styrene comonomer mixture in a weight ratio of from about 1:3 to 3:1 of acrylonitrile to styrene at temperatures in the range from about 50° C to about 150° C in a reactive medium of an oxyalkadienyl polyether polyol wherein said oxyalkadienyl polyether polyol is the reaction product of a polyether polyol of the formula

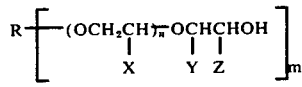

wherein R is a nucleus of an aliphatic polyhydric initiator having from 3 to about 12 carbon atoms and 3 to 8 hydroxy groups, z is an alkyl radical of from 1 to 4 carbon atoms, x and y, independently, are hydrogen or z, n has an average value of from 0 to about 50, m is from 3 to 8 corresponding to the number of hydroxy groups wherein said polyether polyol of the above formula has a molecular weight of from about 4,000 to about 7,000 and has from about 25% to about 75% primary hydroxyl group termination with a conjugated diolefin of the formula

wherein R, independently, is hydrogen chlorine or a hydrocarbon moiety of from 1 to 10 carbon atoms selected from the group of alkyl, cycloalkyl, alkenyl, cycloalkenyl, aryl, aralkyl and alkaryl in the presence of a catalytically effective amount of a catalyst system consisting essentially of a divalent palladium complex at least one trivalent organophosphine ligand and an effective amount of a substance which in the presence of the remainder of the reaction system acts as a Lewis acid at a temperature from about 50° C to about 200° C.

* * * * *